(12) United States Patent
Ehrlich

(10) Patent No.: US 10,613,715 B2
(45) Date of Patent: *Apr. 7, 2020

(54) MINIMALLY INVASIVE USER METADATA

(71) Applicant: Gal Ehrlich, Ramat-Gan (IL)

(72) Inventor: Gal Ehrlich, Ramat-Gan (IL)

( * ) Notice: Subject to any disclaimer, the term of this patent is extended or adjusted under 35 U.S.C. 154(b) by 325 days.

This patent is subject to a terminal disclaimer.

(21) Appl. No.: 15/818,825

(22) Filed: Nov. 21, 2017

(65) Prior Publication Data

US 2018/0074671 A1 Mar. 15, 2018

Related U.S. Application Data

(63) Continuation of application No. 15/044,128, filed on Feb. 16, 2016, now Pat. No. 9,830,055.

(51) Int. Cl.
*G06F 3/048* (2013.01)
*G06F 3/0484* (2013.01)
*G06F 3/0481* (2013.01)
*G06F 9/451* (2018.01)
*G06F 16/9535* (2019.01)
*G06F 8/38* (2018.01)

(52) U.S. Cl.
CPC .......... *G06F 3/0484* (2013.01); *G06F 3/0481* (2013.01); *G06F 8/38* (2013.01); *G06F 9/453* (2018.02); *G06F 16/9535* (2019.01)

(58) Field of Classification Search
None
See application file for complete search history.

(56) References Cited

U.S. PATENT DOCUMENTS

| 8,667,384 | B2 | 3/2014 | Brown et al. |
| 8,861,804 | B1 | 10/2014 | Johnson et al. |
| 2009/0049413 | A1 | 2/2009 | Lehtovirta et al. |
| 2011/0179385 | A1 | 7/2011 | Li et al. |
| 2013/0089243 | A1 | 4/2013 | Sauve et al. |
| 2014/0129981 | A1 | 5/2014 | Soederberg |

(Continued)

FOREIGN PATENT DOCUMENTS

| WO | WO 2015/032308 | 3/2015 |
| WO | WO 2007/094537 | 7/2015 |

OTHER PUBLICATIONS

Advisory Action Before the Filing of an Appeal Brief dated Jun. 1 From the US Patent and Trademark Office Re. U.S. Appl. No. 15/044,128. (7 Pages).

(Continued)

*Primary Examiner* — William C Trapanese

(57) ABSTRACT

A method of dynamic tagging of image objects appearing in media content items associated with a user. The method comprises automatically identifying a plurality of media objects by an image processing analysis of a plurality of media content items of a user, analyzing an output of at least one sensor of a client device for identifying a plurality of suitable push GUI events for presenting a graphical user interface (GUI) to a user of said client device, in each one of said plurality of suitable push GUI events: triggering a presentation of one of said plurality of media objects using said GUI on a display of said client device, said GUI encourages said user to input user defined metadata describing said presented media object, acquiring said user defined metadata from said user using said GUI, and documenting said user defined metadata in association with said presented media object.

20 Claims, 2 Drawing Sheets

(56) References Cited

U.S. PATENT DOCUMENTS

| | | |
|---|---|---|
| 2014/0270407 A1 | 9/2014 | Balakrishnan et al. |
| 2015/0082173 A1 | 3/2015 | El-Saban et al. |
| 2015/0177918 A1 | 6/2015 | Rousseau et al. |
| 2017/0235451 A1 | 8/2017 | Ehrlich |

OTHER PUBLICATIONS

Applicant-Initiated Interview Summary dated Dec. 1, 2016 From the US Patent and Trademark Office Re. U.S. Appl. No. 15/044,128. (3 pages).
Applicant-Initiated Interview Summary dated Apr. 5, 2017 From the US Patent and Trademark Office Re. U.S. Appl. No. 15/044,128. (3 pages).
Notice of Allowance dated Jul. 31, 2017 From the US Patent and Trademark Office Re. U.S. Appl. No. 15/044,128. (13 pages).
Official Action dated Nov. 3, 2016 From the US Patent and Trademark Office Re. U.S. Appl. No. 15/044,128.
Official Action dated Feb. 27, 2017 From the US Patent and Trademark Office Re. U.S. Appl. No. 15/044,128. (13 pages).

MINIMALLY INVASIVE USER METADATA

RELATED APPLICATIONS

This application is a continuation of U.S. patent application Ser. No. 15/044,128 filed on Feb. 16, 2016, the contents of which are incorporated herein by reference in their entirety.

FIELD AND BACKGROUND OF THE INVENTION

The present invention, in some embodiments thereof, relates to image object tagging and, more specifically, but not exclusively, to methods and systems of tagging image objects in images of a specific user.

During the last years, since the advent of digital photography and in particular after the thriving social networks, there are a flood of images and videos which are uploaded to network accessible documents and are uploaded to user computers and data storage, such as webpages and shared folders.

SUMMARY OF THE INVENTION

According to some embodiments of the present invention, there is provided a method of dynamic tagging of image objects appearing in media content items associated with a user, comprising: automatically identifying a plurality of media objects by processing of a plurality of media content items of a user, identifying a plurality of suitable push graphical user interface (GUI) events for presenting a GUI to a user of the client device, in each one of the plurality of suitable push GUI events: triggering a presentation of at least one of the plurality of media objects using the GUI on a display of the client device, the GUI encourages the user to input user defined metadata describing the presented media object, acquiring the user defined metadata from a user input of the user using the GUI, and documenting the user defined metadata in association with the presented media object.

Optionally, the automatically identifying a plurality of media objects is performed by image analysis.

More optionally, the identifying a plurality of suitable push GUI events further comprises: sequentially identifying the plurality of suitable push GUI events by a behavior analysis a user based on a plurality of outputs of at least one sensor of the client device, and identifying the plurality of suitable push GUI events according to the behavior analysis.

More optionally, the analyzing data executed on a client device further comprising: sequentially identifying the plurality of suitable push GUI events by an analysis of execution of a plurality of applications by a hardware processor of the client device, calculating a usage pattern according to the analysis, and identifying the plurality of suitable push GUI events according to the usage pattern.

Optionally, the plurality of media objects comprises at least one member of a group consisting of an unhuman animal, an art piece, a room background, a furniture, and a car.

Optionally, the automatically identifying comprises applying at least one image recognition process on each of the plurality of media content items to identify a predefined media object therein.

Optionally, the plurality of media objects comprises a plurality of images captured using an image sensor of the client device and stored in a media library of the client device.

Optionally, the plurality of media objects comprises a plurality of images captured using an image sensor of another device and stored in a storage outside of the client device.

Optionally, the method comprises receiving a search query comprising at least one keyword matching to respective the user defined metadata from the user, matching the at least one keyword to a database associating the user defined metadata of each of the plurality of media objects to a plurality of additional descriptive keywords, and using the outcome of the matching as an input to a media content object search engine.

Optionally, the plurality of suitable push GUI events are timed spaced from one another by a period of at least one day.

Optionally, the GUI is a window presenting at least a portion of one of the plurality of media content items that depicts one of the plurality of media objects together with a question encouraging a textual input of the input user defined metadata describing the presented media object.

Optionally, the GUI is a window presenting at least a portion of one of the plurality of media content items that depicts a marked version of one of the plurality of media objects.

More optionally, wherein GUI comprises a marking tool allowing a user to mark an additional media object on the portion for providing additional user defined metadata.

More optionally, further comprising identifying the presented media object in at least one new media content item and automatically associating the at least one new media content with respective the user defined metadata.

Optionally, the method comprises receiving a search query comprising at least one keyword matching to respective the user defined metadata from the user and retrieving a respective content media item depicting respective the media object in response to the search query.

According to some embodiments of the present invention, there is provided a method of dynamic tagging of image objects appearing in media content items associated with a user. The method comprises tagging a media content item of a user with user defined metadata describing a media object appearing in the media content item, the user defined metadata is acquired using a GUI presented on a display of a user terminal of the user, identifying a presence of the media object in a plurality of new media content items by an image processing analysis, and tagging each of the plurality of new media content items with the user defined metadata.

According to some embodiments of the present invention, there is provided a client device of dynamic tagging of image objects appearing in media content items associated with a user, comprising: a database comprising a plurality of media content items of a user, a program store storing code, and a processor coupled to the program store for executing the stored code, the code comprising: code instructions for automatically identifying a plurality of media objects by processing of the plurality of media content items, code instructions for identifying a plurality of suitable push GUI events for presenting a graphical user interface (GUI) to a user of the client device, code instructions for performing the following in each one of the plurality of suitable push GUI events: triggering a presentation of one of the plurality of media objects using the GUI on a display of the client device, the GUI encourages the user to input user defined metadata describing the presented media object, acquiring the user defined metadata from the user using the GUI, and documenting the user defined metadata in association with the presented media object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
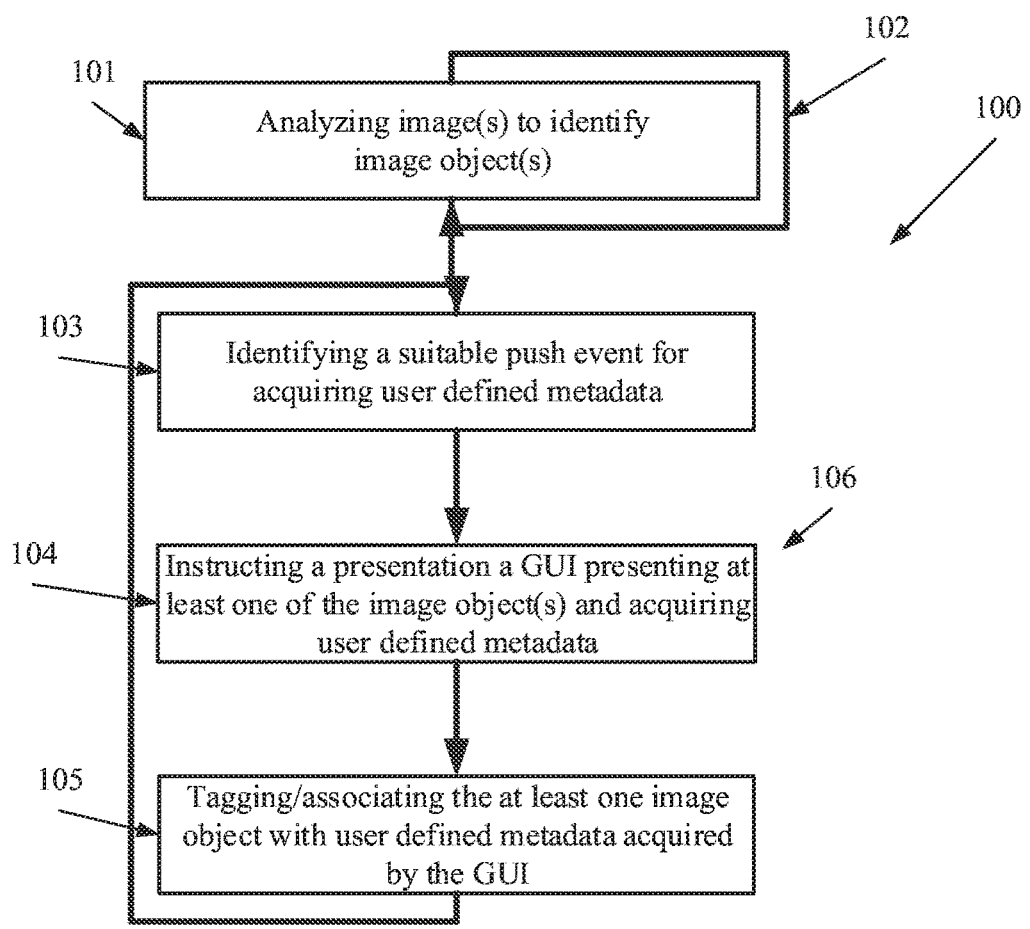
FIG. 1 is a flowchart of a process for iteratively presenting a user with a graphical user interface (GUI) for tagging image objects identified by image analysis of media content items in storage associated with a certain user, according to some embodiments of the present invention.

The present invention, in some embodiments thereof, relates to image object tagging and, more specifically, but not exclusively, to methods and systems of tagging image objects in images of a specific user.

According to some embodiments of the present invention, there are provided methods and systems for tagging media objects such as physical elements or unhuman animals imaged in media content items of a user (e.g. image or video file) with user defined metadata, such as keywords, gathered in one of a plurality of suitable events using a designated GUI. Optionally, a presentation of the designated GUI, for instance a window of an application or a webpage presented by a browser, is triggered when a suitable event is detected by an analysis of outputs of sensors of a client device, for instance an accelerometer or an image sensor which are indicative of an activity of the user. The suitable event may be detected by an analysis of outputs of applications executed on the client device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a flowchart of a process 100 for iteratively presenting a user with a graphical user interface (GUI) for tagging image objects identified by image analysis of media content items in storage associated with a certain user, according to some embodiments of the present invention. The process 100 allows iteratively gathering user-generated metadata describing the image objects from the subjective point of view of the certain user in a minimally invasive manner, for example during events identified as suitable for the user. As used herein, a media content item includes an image, a frame, a video, and/or the like.

As further described below, the GUI, which is optionally presented on a mobile device of the certain user at events identified as suitable for the certain user, is presented in each of the iterations to gather user-generated metadata of a certain image object, for instance a user provided name or description of the image object. The suitable push GUI events are optionally identified based on behavior analysis of data gathered by a module executed on a device of the user, or instance a module that gather data from input components of the device (e.g. accelerometer(s), image sensor(s), and a touch screen) and/or from an analysis of processes such as applications executed on the device. The module is optionally a code stored in a program store of the client device, for instance physical memory of the client device.

The gathered user-generated metadata is optionally used for responding to media content search queries, for instance text based queries, of the certain user, for instance a query for image search in a personalized image library, a query for a World Wide Web (WWW) image search, a query for a video search and/or used for personalizing user preferences.

Figure 2:
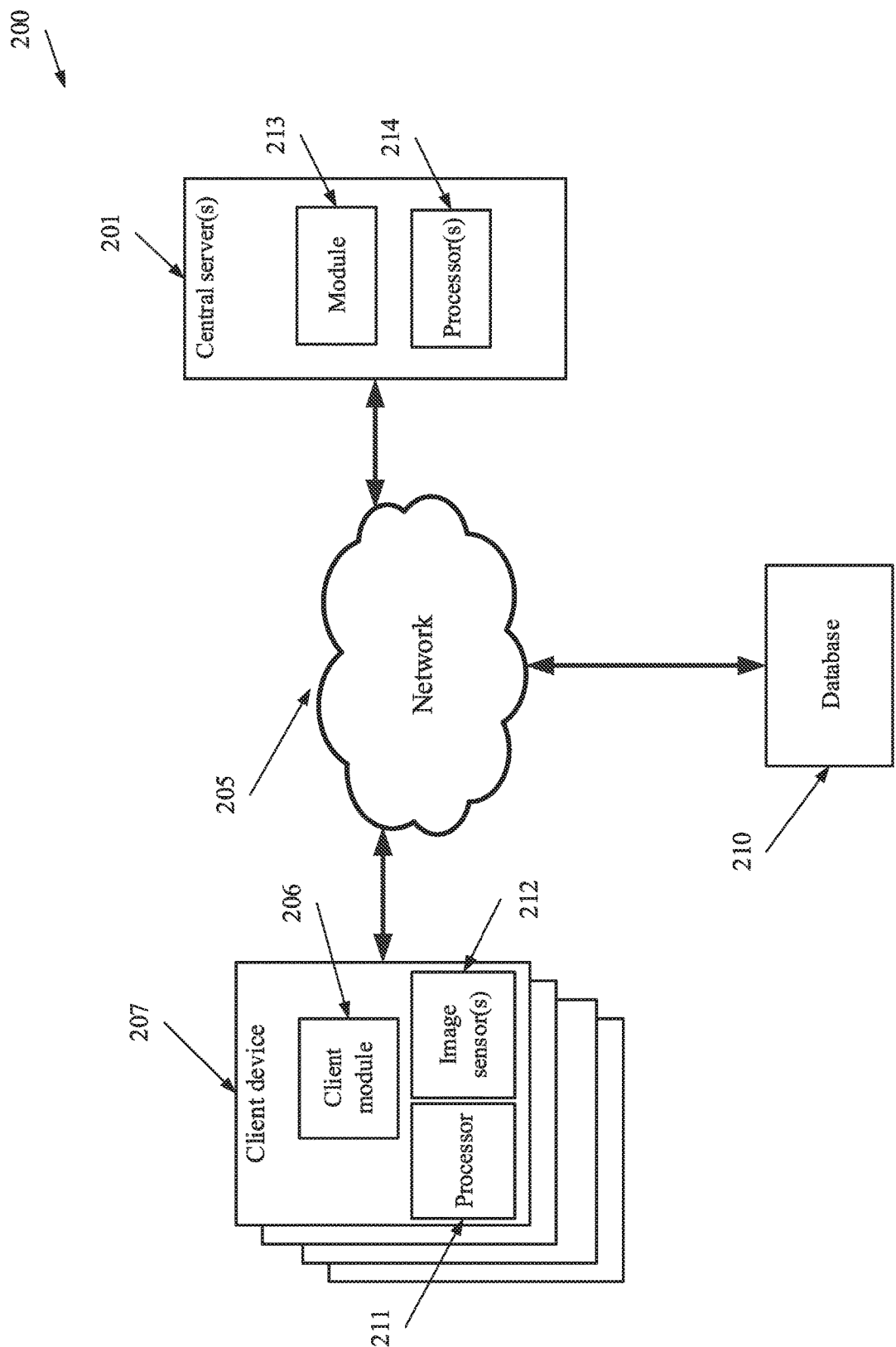
FIG. 2 is a schematic illustration of a system that comprises one or more central server(s) 201 and one or more client modules each executed using processor(s) of one or more client devices for monitoring user behavior, according to some embodiments of the present invention.

Reference is also made to FIG. 2 which is a schematic illustration of a system 200 that comprises one or more central server(s) 201 and one or more client modules 206 each executed using processor(s) 211 of one or more client devices 207 for monitoring user behavior, according to some embodiments of the present invention. A client device, such as 207, may be any user carried device such as a Smartphone, tablet, laptop, and/or a wearable device such as a smartwatch and/or smart glasses. The client device 207 optionally includes one or more image sensors such as cameras for capturing images. The central server(s) 201, which optionally includes hardware processors 214 and central module 213, may be executed on hardware servers and/or virtual machine(s) using hardware resources such as hardware processors and storage. FIG. 2 also depicts an image database 210, such as cloud image storage.

In use as shown at 101, a plurality of media content items are processed to identify one or more image objects (e.g. unhuman animals and/or physical elements such as art pieces, room backgrounds, furniture, cars and/or the like). The plurality of media items may be processed locally by execution of the client module 206 and/or in a central platform by execution of module 213. The processed media objects may be documented in media library(ies) of a certain user, for instance taken from a storage, such as items in one or more personal media libraries, images and/or video shared in a social media platform and/or media items as they are being added to a storage, for instance after capturing and/or loading to a personal media library and/or uploading to a social media and/or a messaging platform. The image objects may be identified by executing a plurality of object recognition algorithms, for instance Feature-based methods wherein feasible matches between object features and image features are found. An exemplary Feature-based method extracts features from the objects to be recognized and the images to be searched such as surface patches, corners, and linear edges. Another recognition algorithm is an interpretation trees method wherein feasible matches between object features and image features are searched using a tree wherein each node in the tree represents a set of matches (the root node represents empty set) and each other node is the union of the matches in the parent node and one additional match.

Optionally, an image object dataset documenting a plurality of image objects is created and/or updated, for instance a table or a matrix or a record set wherein each identified image object is mapped to an image object unique identifier (e.g. a number), one or more image object classifications (e.g. a car, an animal, a person, and a furniture, a tree, a house, and/or any combination of image objects), automatically extracted image object metadata (e.g. color, brand, size, and/or the like), image capturing or storing location, image capturing or storing device identifier, a capturing user identifier, automatically extracted image recognition outputs (e.g. corners, surface patches, corners, and linear edges) and/or reference(s) to one or more origin media content elements, for instance a link storage address and/or a file name. The image object dataset may be stored locally at the client device 207 and/or at database 210 and/or any network based storage. The image object dataset also include fields for user provided metadata per image object. In use, each time a new media content item is captured and/or added to a targeted media library, the image object dataset is updated. This automatically associates existing metadata with the new media content image and/or with the new image objects. Optionally, a media content item as a whole may be identified as an image object.

Optionally, as shown at 102, media content storage and/or capturing events may be monitored to assure iterative analysis of media content items, for instance continuously updating the image object dataset by an analysis of each new media content item for extraction of new media object and/or updating of the image object dataset for documenting a presence of previously identified media objects in new media content items.

As shown at 103, suitable push GUI events for presenting the user with a user metadata acquiring graphical user interface (GUI) for adding user metadata regarding one of the image objects are identified, for instance by an analysis of monitored outputs or execution of sensors or applications of the client device 207 and/or an analysis of a usage pattern of the user (how the user uses the client device 207).

A suitable push GUI event is optionally a timeframe during which the metadata acquiring GUI or an alert linked to the GUI, for instance a notification, is presented to the user. A suitable push GUI event may be detected by an analysis of the output(s) of a monitoring process, for instance a routine of the module 206 executed by the processor(s) 211. The analysis may be applied to detect a usage pattern of applications installed on the client device 207 by the user, for instance when the user uses a business application such as an email client, when the user uses a leisure application such as a game, when the user does not user applications, when the user uses a communication application such as an email client, an instant messaging application, and/or a telephone application. Based on this usage pattern a suitable push GUI event may be identified, for instance just after (e.g. few seconds or minutes) the user used a leisure application just after (e.g. few seconds or minutes) the user finished a communication using a communication application and/or or the like.

Optionally, the suitable push GUI events are time spaced, for instance based on a predefined time spacing period (e.g. a GUI may be presented no more than once a day, a week, or a month). Optionally, the suitable push GUI events are synchronized according to an analysis of the calendar, for instance on open slots only. Optionally, the suitable push GUI events are synchronized according the time of the day or the day of the week.

Optionally, the suitable push GUI events are randomly timed, for instance based on an output of a random generation module. Additionally or alternatively, the suitable push GUI events are timed based on user input, for instance in a low frequency, for instance once a week, in a medium frequency, for instance one 2 time a day, or in a high frequency, for instance every hour.

Additionally or alternatively, the suitable push GUI events are timed based on a learning mechanism that learns the behavior of a user based on responsiveness to previous suitable push GUI events. In such embodiments, a time of location of a decline or a delay of a presentation of a GUI during a GUI event may be recorded, for instance from outputs of the timer and/or the locational data service of the client terminal and used for identifying when and/or where the user responsiveness to suitable push GUI events is low, high and/or medium.

Additionally or alternatively, usage patterns of a user during a plurality of days are analyzed using a statistical classier to estimate when the user is more likely to respond to a challenge presented to him by the metadata acquiring GUI.

Additionally or alternatively, one or more suggested tags are selected for the image object, for instance based on the classification of the image object, optionally using a database of suggested tags per classification. In such a manner, an identified car may provided with tags such as "my car", "shagmobile", "cool car", and/or the like.

As shown at 104, in each suitable push GUI event a metadata acquiring GUI is presented. Optionally, in each suitable push GUI event one or more media objects are selected, for instance based on a scheduling mythology such as first in first out, last in first out, most commonly identified media object, and/or any combination thereof.

The metadata acquiring GUI optionally presents the certain user with one or more media content items, such as image(s) depicting an image object and challenge the user to provide a user defined metadata such as a text, a tag, and/or a user indication. For instance, the user may input a text describing or naming an image object and/or select one out of a number of optional tags for an image object, for instance one out of a number of options identified by application object recognition analysis processes. For example, the GUI is a window presenting image(s) or portion(s) of image(s) depicting an image object, a question selected according to the classification of the image object and a field allowing a user to input text related to the image object. Optionally, a contour or other graphical element(s) marking the image object are used. In another example, a button allowing a user to record audibly a description is presented to the user. The recorded content is then converted to text as known in the art.

Optionally, the GUI allows the certain user to request a presentation of an additional image object for tagging.

Optionally, the GUI allows the certain user to request another user to tag an image object, for instance by sending an image depicting the image object to one or more of his friends in a social media service such as Facebook™.

Optionally, the GUI allows the certain user to rank a media object item. The rank is documented, for instance in the media object dataset, and may be used for ordering matching media content items which are retrieved in response to a search query.

As indicated above, user defined metadata is associated with an image object identified and tagged using recognition algorithms. In use, as further explained below, the user defined metadata may be used for automatically tagging image objects in new media content items, such as new images and video files. Such automatic tagging may require matching between object(s) in the new media content items and the tagged media objects or characteristics thereof, for instance surface patches, corners, and linear edges which are documented in a respective record. Such matching may be performed in different levels of certainty. For instance, a match may be ranked as a high probability match, a low probability match, and/or an average probability match.

In such embodiments, a media object identified as having a low probability match or an average probability match with a tagged media object and/or identified as matching to a plurality of tagged media objects may be verified by presenting, using the GUI, a clarification question that uses data from the tagged media object(s). For instance, a GUI that presents an image object identified is a dog and matched with a dog associated with the user defined metadata "Barney" and a dog associated with the user defined metadata "Gringo" also present a selection question requiring form the user to indicate whether the imaged animal is "Barney" or "Gringo". Additionally or alternatively, the GUI is used to validate automatic recognition of a media object by a recognition algorithm, for instance by presenting the user with a question is that dog is "Barney".

The metadata acquiring GUI optionally provides the certain user with an image object marking tool, for instance a scribble marker that allows the user to select a sub-media object in a presented media content item, for instance a face, a person, a car, a furniture and/or any physical element found in a presented media object which may be even the media content item as a whole. In such an embodiment, a new image object may be identified and added to the image object dataset without any a marking action. The object delineation may be done using known image processing functions.

Optionally, after the marking is completed, the user is required to provide user defined metadata and/or to confirm an automatic classification.

As shown at 105, the user defined metadata is used for tagging the related image object, for instance added to the image object dataset, for instance in designated fields as described above.

As shown at 106, this process may be repeated until all recognized image objects are tagged with user defined metadata.

After the image object dataset is at least partly built and includes user defined metadata tagging at least some of the identified image objects, the certain user may search, for instance keyword search, for media content items based on a search query that include search terms he inputted as tags.

User defined data added to the image object dataset may be used for updating the image object dataset, for instance by processing the plurality of media content items to identify the tagged image object using user defined metadata. In such embodiments, an image processing based on the user defined metadata may be used, for instance an algorithm searching features defined by the user defined metadata.

User defined data may be a negative indication. For instance a negative response to the question "is that Barney?" may be used for reducing the tag "Barney" and/or for adding a tag "not Barney".

Additionally or alternatively, the search involves a natural language processing (NLP) process wherein free text is analyzed is supported by using user defined metadata. In such embodiment, the understanding of the user input may be supported by the media object dataset.

Additionally or alternatively, the media object dataset is used for managing storage of media content items, for instance in the memory of the client terminal and/or in a cloud storage. The management may be performed by archiving media content items tagged as junk, scored with a low score and/or depict certain media objects, for instance media objects which have not been documented in new media content items for a certain period, media objects selected by the user, and/or predefined media objects such as documents, screenshots, and/or the like. The archiving may be performed after a predefined period.

Additionally or alternatively, the media object dataset is used for managing access level to media content items, for instance based on the presence or absence of certain media objects therein. In such a manner, media content items depicting a certain person or element may be stored in a designated storage, password protected and/or present after a biometric identification of a user accessing a respective database.

Additionally or alternatively, the user defined metadata is used for personalizing general visual search of the user in general databases, for instance in a WWW search engine, a desktop search and/or any other user keyword search. In such embodiments the image object search may be used to convert user defined metadata into keywords describing the respective media content item.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a processor, a client device, an imaging sensor and a network is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of dynamic tagging of image objects appearing in media content items associated with a user, comprising:

automatically identifying a plurality of media objects by processing of a plurality of media content items of a user;

calculating at least one usage pattern according to an analysis of at least one of an execution of a plurality of applications and outputs of at least one sensor of a client device during a plurality of days;

identifying a plurality of suitable push graphical user interface (GUI) events during which the user is more likely to respond to a challenge presented to him according to the at least one usage pattern;

in each one of the plurality of suitable push GUI events:

triggering a presentation of at least one of the plurality of media objects with a question encouraging a textual input comprising user defined metadata describing the at least one presented media object, the presentation is performed using the GUI on a display of the client device, acquiring the user defined metadata from the textual input of the user using the GUI, and documenting the user defined metadata in association with the presented media object.

2. The method of claim 1, wherein the automatically identifying a plurality of media objects is performed by image analysis.

3. The method of claim 1, wherein the at least one usage pattern is calculated according to an analysis of the execution of the plurality of applications.

4. The method of claim 1, wherein the at least one usage pattern is calculated according to an analysis of the outputs of at least one sensor.

5. The method of claim 1, wherein the plurality of media objects comprises at least one member of a group consisting of an unhuman animal, an art piece, a room background, a furniture, and a car.

6. The method of claim 1, wherein the automatically identifying comprises applying at least one image recognition process on each of the plurality of media content items to identify a predefined media object therein.

7. The method of claim 1, wherein the plurality of media objects comprises a plurality of images captured using an image sensor of the client device and stored in a media library of the client device.

8. The method of claim 1, wherein the plurality of media objects comprises a plurality of images captured using an image sensor of another device and stored in a storage outside of the client device.

9. The method of claim 1, further comprising receiving a search query comprising at least one keyword matching to respective the user defined metadata from the user, matching the at least one keyword to a database associating the user defined metadata of each of the plurality of media objects to a plurality of additional descriptive keywords, and using the outcome of the matching as an input to a media content object search engine.

10. The method of claim 1, wherein the plurality of suitable push GUI events are timed spaced from one another by a period of at least one day.

11. The method of claim 1, wherein the GUI is a window presenting at least a portion of one of the plurality of media content items that depicts one of the plurality of media objects together with the question encouraging the textual input of the input user defined metadata describing the presented media object.

12. The method of claim 1, wherein the GUI is a window presenting at least a portion of one of the plurality of media content items that depicts a marked version of one of the plurality of media objects.

13. The method of claim 12, wherein GUI comprises a marking tool allowing a user to mark an additional media object on the portion for providing additional user defined metadata.

14. The method of claim 12, further comprising identifying the presented media object in at least one new media content item and automatically associating the at least one new media content with respective the user defined metadata.

15. The method of claim 1, further comprising receiving a search query comprising at least one keyword matching to respective the user defined metadata from the user and retrieving a respective content media item depicting respective the media object in response to the search query.

16. The method of claim 1, wherein the plurality of suitable push GUI events are identified by an analysis of the output of the image sensor.

17. The method of claim 1, wherein the at least one usage pattern is calculated according to an analysis of the usage of a touch screen.

18. The method of claim 1, wherein the at least one usage pattern is calculated according to an analysis of the usage of type of the application.

19. A method of dynamic tagging of image objects appearing in media content items associated with a user, comprising:

tagging a media content item of a user with user defined metadata describing a media object appearing in the media content item, the user defined metadata is acquired using a graphical user interface (GUI) presented on a display of a user terminal of the user during a suitable push GUI event, the suitable push GUI event is identified according to at least one usage pattern indicative when the user is more likely to respond to a challenge presented to him and calculated based on an analysis of at least one of an execution of a plurality of applications and outputs of at least one sensor of a client device during a plurality of days;

identifying a presence of the media object in a plurality of new media content items by an image processing analysis; and tagging each of the plurality of new media content items with the user defined metadata.

20. A client device of dynamic tagging of image objects appearing in media content items associated with a user, comprising:

a database comprising a plurality of media content items of a user;

a program store storing code; and a processor coupled to the program store for executing the stored code, the code comprising:

code instructions for automatically identifying a plurality of media objects by processing of the plurality of media content items;

code instructions for calculating at least one usage pattern according to an analysis of at least one of an execution of a plurality of applications and outputs of at least one sensor of a client device during a plurality of days;

code instructions for identifying a plurality of suitable push graphical user interface (GUI) events during which the user is more likely to respond to a challenge presented to him according to the at least one usage pattern;

code instructions for performing the following in each one of the plurality of suitable push GUI events:

triggering a presentation of at least one of the plurality of media objects with a question encouraging a textual input comprising user defined metadata describing the at least one presented media object, the presentation is performed using the GUI on a display of the client device, acquiring the user defined metadata from the textual input, and documenting the user defined metadata in association with the presented media object.

* * * * *